United States Patent [19]
Fincher

[11] 4,142,152
[45] Feb. 27, 1979

[54] SENSING ARRANGEMENTS

[75] Inventor: David J. Fincher, Chippenham, England

[73] Assignee: Westinghouse Brake and Signal Company Limited, Chippenham, England

[21] Appl. No.: 554,421

[22] Filed: Mar. 3, 1975

[30] Foreign Application Priority Data

Mar. 8, 1974 [GB] United Kingdom ............... 10503/74

[51] Int. Cl.² ...................... B60Q 5/00; G08B 21/00; B60T 7/12
[52] U.S. Cl. .................................... 324/165; 340/672; 340/70; 235/92 NG; 307/122
[58] Field of Search .................. 340/271, 70; 324/165; 307/122; 235/92 NG

[56] References Cited

U.S. PATENT DOCUMENTS

| 3,559,205 | 1/1971 | Colby | 340/279 |
| 3,728,565 | 4/1973 | O'Callaghan | 310/168 |
| 3,728,676 | 4/1973 | Brown | 340/70 |
| 3,827,024 | 7/1974 | Anderson et al. | 340/70 |

Primary Examiner—Robert Segal
Assistant Examiner—Vincent J. Sunderdick
Attorney, Agent, or Firm—J. B. Sotak; R. W. McIntire, Jr.

[57] ABSTRACT

This disclosure relates to a directional sensing arrangement including a rotatable member having a plurality of permanent magnets which magnetically influence a first and second spaced stationary sensor. The rotation of the member causes the magnets to sequentially operate the first and second sensors so that neither, either or both are actuated. The first and second sensors are coupled to a logic network which deciphers the sequential actuations for determining the direction of rotation of the rotatable member.

9 Claims, 1 Drawing Figure

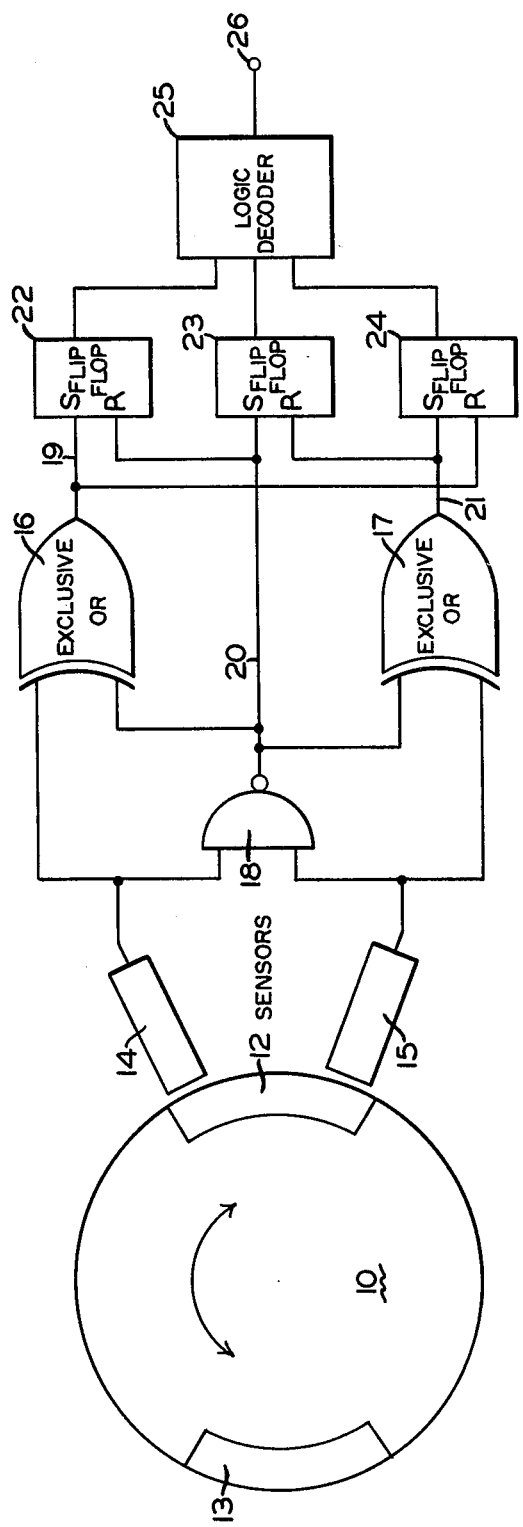

SENSING ARRANGEMENTS

SUBJECT OF THE INVENTION

This invention relates to directional sensing apparatus, and more particularly to an arrangement which is capable of sensing the direction of relative rotation of two movable parts or sections having a pair of spaced sensor means and sensor actuating means for conditioning the respective spaced sensor means whereby logic means responds to the condition of the pair of spaced sensor means for determining the direction of rotation.

BACKGROUND OF THE INVENTION

In certain automatic control systems, such as, mass and/or rapid transit operation, it is necessary to determine the direction of movement of the railway vehicle or train. When a train stops at a station, it is essential to prevent "roll-back" or "run-back" in order to preclude injury to boarding and discharging passengers. It will be appreciated that inadvertent rearward movement of the train can cause a commuter to be thrown down or to be tossed against the bulkhead, door jams or the like. In addition, "roll-back" can result in the misalignment of the doors of the vehicles and the gates on the station platform which could make it difficult, if not impossible, for passengers to board or alight from the train. Thus, in order to provide the highest degree of safety to users and operators of mass and/or rapid transit systems, it is highly desirous to detect the direction of movement of the vehicle or train so that corrective measures may be immediately taken to preclude the development of a dangerous situation.

OBJECTS AND SUMMARY OF THE INVENTION

Accordingly, it is an object of this invention to provide a new and improved directional sensing apparatus for a mass and/or rapid transit system.

A further object of this invention is to provide a novel electronic arrangement for sensing the relative rotation of two movable parts.

Another object of this invention is to provide a unique directional sensing apparatus having first and second relatively movable sections, the first section having first and second sensors, the second section having at least one sensor actuator being so proportioned and arranged so that the relative positions of the first and second sections result in neither of the first and second sensors to be actuated, result in either of the first and second sensors to be actuated and result in both the first and second sensors to be actuated during relative movement of the first and second sections, and logic means responsive to the actual condition of the first and second sensors to determine the relative directional movement of the first and second sections.

Yet a further object of this invention is to provide a novel directional sensing arrangement which is economical in cost, reliable in practice, dependable in service, durable in use and efficient in operation.

According to the invention there is provided a sensing arrangement including first and second relatively movable sections, the first section having first and second sensors, the second section having at least one sensor actuator dimensioned and arranged so that in operation and according to the relative positions of said first and second sections, neither or either or both of said sensors will be actuated.

Preferably there is also provided logic means or any other suitable device or arrangement associated with said sensors whereby according to the sequence of actuation of said sensors, the direction of relative movement of said first and second sections may be determined. The sensors may be electrical in nature, and the logic means may accordingly be a suitably inter-connected group of logic gates. The sensor actuator may be a permanent magnet, and the sensors may be magnetic field dependent resistors or magnetically operated switches, such as reed switches. The first section may be stationary and fixed on a structure such as a vehicle whose direction of movement is to be sensed. The relative movement of the first and second sections may be rotation, and the second section may be mounted on or form part of a shaft, axle, or wheel.

BRIEF DESCRIPTION OF THE DRAWINGS

In order that the invention may be more clearly understood and readily carried into effect, a select embodiment of the same will now be described by way of example with reference to the accompanying drawing wherein the sole or single FIGURE is a schematic diagram of the directional sensing apparatus of the present invention.

DETAILED DESCRIPTION OF THE ILLUSTRATED EMBODIMENT OF THE INVENTION

Referring now to the single FIGURE of the drawing, a disc 10 is mounted on an axle 11 to rotate therewith and carries two actuators or permanent magnets 12 and 13 respectively. As shown, the permanent magnets 12 and 13 are arcuate in form and are disposed diametrically across from each other on the disc 10. First and second stationary sensors 14 and 15 are suitably mounted by appropriate mechanical means (not shown) in proximity to the periphery of disc 10. The sensors are arranged such as to respond to the magnets 12 and 13 when mutually adjacent as shown in the drawing. The arc or peripheral length of the magnets 12 and 13 are so dimensioned or proportioned, and the sensors 14 and 15 are so positioned, that over only a limited angular positional range of the disc 10 do both the sensors 14 and 15 simultaneously respond to one of the magnets 12 and 13. Immediately on either side of this limited angular range, only one of the sensors 14 and 15 will respond at any given time, and with further angular displacement of the disc 10, neither of the sensors 14 and 15 will respond.

Thus with clockwise rotation of the axle 11 and the disc 10, the repetitive sequence of events is (1) neither sensor 14 nor 15 responds, (2) only the first sensor 14 responds, (3) both of the sensors 14 and 15 respond, (4) only the second sensor 15 responds, and (5) neither sensor 14 nor 15 responds. The reverse order of responses or the converse sequence of operation occurs during anti-clockwise rotation of the disc 10. Therefore by determining which of the sensors 14 and 15 responds during the "neither responds" to "both respond" transition and/or vice versa, the direction of angular movement or rotation of the disc 10 can be readily determined and can be used to indicate the forward or reverse movement of the railway vehicle. Assuming the sensors 14 and 15 produce suitable electrical outputs, e.g. by being magnetically operable devices, such as, variable resistors or reed switches operating in conjunction with a suitable d.c. power supply (not shown), a form of electronic logic suitable for the above determination is shown appropriately electrically coupled to the sensors 14 and 15. The logic means or circuit includes first and second dual or two input exclusive-OR gates 16 and 17, each receiving one input directly from one of the sensors 14 and 15, and the other input from the output of a dual or two input NAND gate 18 whose inputs are received directly from the sensors 14 and 15. For the purpose of convenience and for subsequent reference purposes, the output of the first exclusive-OR gate 16 is labeled 19, the output of the NAND gate 18 is labeled 20, and the output of the second exclusive-OR gate 17 is labeled 21.

The gate outputs 19, 20, and 21 are connected as shown to the "SET" (S) and "RESET" (R) inputs of a ring-of-three counter comprising three interconnected bistable multivibrators or flip-flop circuits 22, 23, and 24. It is assumed either that the flip-flops respond to logical "0" inputs (see below), or that logic level inverters (not shown) are interposed between the gate outputs and the flip-flops. Assuming that the outputs of the sensors 14 and 15 are logical "1" when responding to one of the magnets 12 and 13, and logical "0" when not so responding, then the truth table for the various outputs is as follows:

| SENSORS | | GATE OUTPUTS | | |
|---|---|---|---|---|
| 14 | 15 | 19 | 20 | 21 |
| 0 | 0 | 1 | 1 | 1 |
| 1 | 0 | 0 | 1 | 1 |
| 1 | 1 | 1 | 0 | 1 |
| 0 | 1 | 1 | 1 | 0 |

Remembering that the flip-flops respond to the 0's as though they were "SET" signals (see above), the outputs of the flip-flops (starting from all "RESET") for clockwise rotation of the disc 10 are as follows:

| GATE OUTPUTS | | | FLIP-FLOP OUTPUTS | | |
|---|---|---|---|---|---|
| 19 | 20 | 21 | 22 | 23 | 24 |
| — | — | — | 0 | 0 | 0 |
| SET | — | — | 1 | 0 | 0 |
| — | SET | — | 0 | 1 | 0 |
| — | — | SET | 0 | 0 | 1 |
| SET | — | — | 1 | 0 | 0 |
| — | SET | — | 0 | 1 | 0 |
| — | — | SET | 0 | 0 | 1 |

Correspondingly, the flip-flop outputs for anti-clockwise rotation of the disc 10 are as follows:

| GATE OUTPUTS | | | FLIP-FLOP OUTPUTS | | |
|---|---|---|---|---|---|
| 19 | 20 | 21 | 22 | 23 | 24 |
| — | — | — | 0 | 0 | 0 |
| — | — | SET | 1 | 0 | 1 |
| — | SET | — | 0 | 1 | 1 |
| SET | — | — | 1 | 1 | 0 |
| — | — | SET | 1 | 0 | 1 |
| — | SET | — | 0 | 1 | 1 |
| SET | — | — | 1 | 1 | 0 |

It will be appreciated that after the initial startup period, only a single or one of the flip-flop outputs will be a logical "1" for clockwise rotation of the disc 10; whereas for anti-clockwise rotation, two flip-flop outputs will be logical "1". Thus by provision of a suitable logic decoding circuit 25 responsive to these distinct conditions, it is possible to provide an output 26 on which will appear a signal indicating "clockwise" or a signal indicating "anti-clockwise" as the case may be, in respect of the direction of rotation of the disc 10.

It will be appreciated that other suitable logic arrangement may be employed for responding to the sensor outputs to distinguish between the directions of movement. Further, any suitable number of permanent magnets or other suitable sensor actuators may be utilized in practicing the subject invention.

As previously mentioned, the above described arrangement can be employed for sensing the directional movement of a vehicle, such as a rapid and/or rapid transit railway vehicle or train. The directional sensing arrangement may be used as a "roll-back" or "run-back" detector for sensing reverse motion of a transit vehicle or train. This is potentially useful in circumstances where reverse movement of a vehicle or train is undesirable or even dangerous. The arrangement may be duplicated on the vehicle or train, with only one arrangement being actuated at a time, according to the direction of travel, and this will enable the same signals to mean "forward" and "reverse" regardless of the actual direction of travel. It will also be obvious that as an alternative or addition to the direction sensing facility described above, speed proportional signals may also be derived from the sensing apparatus by providing additional components or equipment, such as, require counting and logic circuits or networks.

If desired, the disposition of the sensors and sensor actuator or actuators on the fixed and moving sections of the arrangement may be reversed. The arrangement may be constructed or adapted for sensing movement other than rotation, such as linear movement. The arrangement may be applied to determining the position of a lift or elevator or similarly vertical or inclined conveyance.

The sensor actuator or actuators may be a piece or pieces of ferrous or magnetic metal, and could be in the form of ferrous metal vane, with the sensors 14 and 15 being proximity switches. Where more than one sensor actuator is employed, simultaneous actuation of the sensors need not be by the same actuator, i.e. in the illustrated embodiment, one of the sensors 14 and 15 could be angularly displaced round the disc 10 to a position in which the brief simultaneous actuation of the sensors 14 and 15 was caused by the actuators 12 and 13 (or 13 and 12) respectively. (The general principle in the case of simultaneous sensor actuation by different actuators is that the correct sequence of actuation i.e. phase sequence, be maintained.)

Having now described the invention, what I claim as new and desire to secure by Letters Patent, is:

1. Directional sensing apparatus comprising, first and second relatively movable sections, said first section having first and second sensors, said second section having at least one sensor actuator being so proportioned and arranged so that the relative positions of said first and second sections result in neither of said first and second sensors to be actuated, result in either of said first and second sensors to be actuated and result in both of said first and second sensors to be actuated during relative movement of said first and second sections, and logic means including a plurality of gates which control the condition of a ring counter and being responsive to the actual condition of said first and second sensors to determine the relative directional movement of said first and second sections.

2. The directional sensing apparatus as defined in claim 1, wherein said at least one sensor actuator is a permanent magnet.

3. The directional sensing apparatus as defined in claim 1, wherein said second movable section is a rotatable disc having a permanent magnet located on diametrically opposite sides of said rotatable disc.

4. The directional sensing apparatus as defined in claim 1, wherein said first and second sensors take the form of magnetically operable devices.

5. The directional sensing apparatus as defined in claim 1, wherein said logic means includes a two input NAND gate having one input connected to said first sensor and the other input connected to said second sensor.

6. The directional sensor apparatus as defined in claim 5, wherein said logic means includes a pair of two input exclusive OR gates with one input of said pair of exclusive OR gates connected to the output of said NAND gate and the other input of said pair of exclusive OR gates separately connected to said first and second sensors, respectively.

7. The directional sensor apparatus as defined in claim 5, wherein said logic means includes a plurality of flip-flop circuits connected to the outputs of said NAND and OR gates.

8. The directional sensing apparatus as defined in claim 7, wherein said logic means includes a decoding circuit connected to said flip-flop circuits for determining the electrical state of said flip-flop circuits.

9. The directional sensing apparatus as defined in claim 1, wherein said sensor actuator is an arcuate permanent magnet having arc which is capable of spanning said first and second sensors and results in the actuation of said first and second sensors.

* * * * *